United States Patent
Cyllik et al.

(10) Patent No.: US 11,067,431 B2
(45) Date of Patent: *Jul. 20, 2021

(54) METHOD FOR DETERMINING TIRE CHARACTERISTIC INFLUENCING VARIABLES AND CONTROL DEVICE THEREFOR

(71) Applicant: Continental Reifen Deutschland GmbH, Hannover (DE)

(72) Inventors: Adrian Cyllik, Hannover (DE); Carsten Hahn, Laatzen (DE); Michael Lehn, Celle (DE); Heiner Volk, Neustadt (DE)

(73) Assignee: Continental Reifen Deutschland GmbH, Hannover (DE)

(*) Notice: Subject to any disclaimer, the term of this patent is extended or adjusted under 35 U.S.C. 154(b) by 286 days.

This patent is subject to a terminal disclaimer.

(21) Appl. No.: 15/905,510

(22) Filed: Feb. 26, 2018

(65) Prior Publication Data
US 2018/0180463 A1   Jun. 28, 2018

Related U.S. Application Data

(63) Continuation of application No. PCT/EP2016/060612, filed on May 12, 2016.

(30) Foreign Application Priority Data

Aug. 25, 2015   (DE) .......................... 102015216210.9

(51) Int. Cl.
*G01G 19/02*   (2006.01)
*B60C 11/24*   (2006.01)
*G01G 19/08*   (2006.01)

(52) U.S. Cl.
CPC .......... *G01G 19/027* (2013.01); *B60C 11/246* (2013.01); *G01G 19/086* (2013.01)

(58) Field of Classification Search
CPC .......................... G01G 19/027; B60C 11/246
See application file for complete search history.

(56) References Cited

U.S. PATENT DOCUMENTS

| 9,340,211 | B1* | 5/2016 | Singh .................. B60W 40/068 |
| 2009/0210111 | A1* | 8/2009 | Laermer ............... B60T 8/1725 |
| | | | 701/29.5 |

(Continued)

FOREIGN PATENT DOCUMENTS

DE   10329700 A1   1/2005

OTHER PUBLICATIONS

International Search Report dated Jul. 12, 2016 of international application PCT/EP2016/060612 on which this application is based.

*Primary Examiner* — Jess Whittington
(74) *Attorney, Agent, or Firm* — Gregory Adams; David L. Cate

(57) ABSTRACT

A method is for determining a tire characteristic influencing variable and includes: a) detecting an acceleration of a measurement point on a tire inner side of a vehicle tire, wherein a deviation, caused by contact of the vehicle tire with a roadway, of the acceleration of the measurement point within an observation window is detected, b) deriving at least one analytical characteristic variable which is characteristic of the detected acceleration, wherein the at least one analytical characteristic variable characterizes the non-periodic profile of the detected acceleration within one tire rotation, c) determining at least one tire characteristic influencing variable in a manner dependent on the at least one analytical characteristic variable, wherein a mathematical mapping yields the dependency between the analytical characteristic variable and the tire characteristic influencing variable, wherein the mathematical mapping assigns at least (Continued)

one tire characteristic influencing variable to the at least one derived analytical characteristic variable.

20 Claims, 5 Drawing Sheets

(56) References Cited

U.S. PATENT DOCUMENTS

| | | | | |
|---|---|---|---|---|
| 2010/0186492 A1* | 7/2010 | Morinaga | B60C 11/24 | |
| | | | 73/146 | |
| 2013/0261991 A1* | 10/2013 | Tebano | B60C 23/06 | |
| | | | 702/41 | |
| 2015/0019165 A1* | 1/2015 | Theuss | G01G 19/12 | |
| | | | 702/173 | |
| 2016/0033367 A1* | 2/2016 | Unterreiner | G01M 17/022 | |
| | | | 73/8 | |
| 2016/0288596 A1* | 10/2016 | LeMense | B60C 23/0462 | |
| 2016/0318356 A1* | 11/2016 | McMillen | G01B 7/06 | |
| 2017/0097223 A1* | 4/2017 | Darrer | G01B 17/00 | |

* cited by examiner

| | |
|---|---|
| $F_z$ | WHEEL LOAD |
| $a_r$ | RADIAL ACCELERATION |
| $a_t$ | TANGENTIAL ACCELERATION |
| MP | MEASUREMENT POINT |
| L | TIRE CONTACT PATCH REGION |

…

METHOD FOR DETERMINING TIRE CHARACTERISTIC INFLUENCING VARIABLES AND CONTROL DEVICE THEREFOR

CROSS REFERENCE TO RELATED APPLICATIONS

This application is a continuation application of international patent application PCT/EP2016/060612, filed May 12, 2016, designating the United States and claiming priority from German application 10 2015 216 210.9, filed Aug. 25, 2015, and the entire content of both applications is incorporated herein by reference.

FIELD OF THE INVENTION

The invention relates to a method for determining tire characteristic influencing variables, in particular a wheel load acting on a vehicle tire or a profile depth, and a control unit for carrying out the method.

BACKGROUND OF THE INVENTION

It is known for a tire sensor module to be arranged on a tire inner side of a vehicle tire, which tire sensor module can determine characteristic variables of the vehicle tire, for example a tire pressure or a tire temperature, and can transmit these by means of a radio signal to a control unit. Furthermore, a tire sensor module of this type can also detect an acceleration, wherein in particular, a radial acceleration at the tire inner side can be determined. From the radial acceleration, it is possible not only to determine a motion state of the vehicle tire but also to draw conclusions regarding tire characteristic influencing variables, for example a wheel load acting on the vehicle tire or a profile depth of a tire profile of the vehicle tire, by virtue of the profile of the radial acceleration being evaluated over a time period or over a traversed rolling circumference. A disadvantage of previous evaluation methods is that the profile of the radial acceleration is influenced not only by a tire characteristic influencing variable but by multiple influencing variables simultaneously, such that the determination of the respective characteristic influencing variable is inaccurate if at least one of the other parameters is unknown.

SUMMARY OF THE INVENTION

It is an object of the invention to provide a method for determining tire characteristic influencing variables, which method ensures high accuracy and high reliability in the determination. It is furthermore an object of the invention to provide a control unit for carrying out the method.

The object can, for example, be achieved via a method for determining a tire characteristic influencing variable. The method includes the steps of: a) detecting an acceleration of a measurement point on a tire inner side of a vehicle tire, wherein a deviation, caused by contact of the vehicle tire with a roadway, of the acceleration of the measurement point within an observation window is detected; b) deriving at least one analytical characteristic variable which is characteristic of the detected acceleration, wherein the at least one analytical characteristic variable characterizes the non-periodic profile of the detected acceleration within one tire rotation; and, c) determining at least one tire characteristic influencing variable in a manner dependent on the at least one analytical characteristic variable, wherein a mathematical mapping yields the dependency between the analytical characteristic variable and the tire characteristic influencing variable, wherein the mathematical mapping assigns at least one tire characteristic influencing variable to the at least one derived analytical characteristic variable.

The object can, for example, also be achieved via a control unit including: a processor; a non-transitory computer readable storage medium having a program code stored thereon; and, the computer program code being configured, when executed by the processor, to determine at least one tire characteristic influencing variable from at least one analytical characteristic variable, transmitted to the control unit, in a manner dependent on a mathematical mapping, wherein, for this purpose, on the control unit, an assignment of at least one derived analytical characteristic variable to at least one tire characteristic influencing variable can be performed via the mathematical mapping.

According to the invention, provision is accordingly made for at least one analytical variable which characterizes the profile of a detected acceleration to be derived, and for the at least one analytical characteristic variable to be assigned at least one tire characteristic influencing variable, wherein the assignment is preferably unique, that is, a mathematical mapping is provided which maps the at least one derived analytical characteristic variable uniquely onto the at least one tire characteristic influencing variable, such that each value of the at least one analytical characteristic variable can be assigned exactly one value of the at least one tire characteristic influencing variable. A one-to-one mapping may preferably also be provided. This already yields the advantage that an exact determination of the at least one tire characteristic influencing variable can be performed over the entire range, because a unique assignment is provided.

Here, tire characteristic influencing variables are to be understood in particular to mean a wheel load and a profile depth. In a method according to the invention, it is thus possible in particular for two analytical characteristic variables, for example, to be determined from the profile of the acceleration, wherein both are dependent on the profile depth and dependent on the wheel load, and the two analytical characteristic variables can be assigned a unique profile depth and/or a unique wheel load via a corresponding mathematical mapping, for example a mapping matrix. This already has the advantage that an exact determination of the respective tire characteristic influencing variable is possible from the profile of the acceleration, even if the profile of the acceleration in the observed range is dependent on more than one tire characteristic influencing variable. It is thus possible in accordance with this method for the influence of a particular influencing variable on the profile of the acceleration to be compensated or canceled out in order to thereby be able to determine the further influencing variables.

In an alternative embodiment, it is also possible from the profile of the acceleration to derive only one analytical characteristic variable, which is preferably dependent only on the wheel load, that is, on which the profile depth has virtually no influence. The analytical characteristic variable can thus be uniquely assigned a wheel load via a corresponding mathematical mapping, for example via a calibration curve. Via the unique assignment, an exact determination of the wheel load is possible over the entire range, without the profile depth having a significant influence here.

For the determination of the analytical characteristic variable, firstly an acceleration of a vehicle tire at a measurement point is detected, wherein the acceleration is measured at a tire inner side in a region situated opposite a tread of the vehicle tire, preferably in a tire center or at a tire apex, such that a change in the acceleration of the measurement point caused by a deformation of the vehicle tire during the contact with a roadway can be determined. For this purpose, a tire sensor module may preferably be used which is arranged on the tire inner side or is recessed into the tire inner side, such that the acceleration of the vehicle tire at a measurement point on or in the vehicle tire can be detected.

The acceleration is in this case measured over a time period, such that, for the determination of the at least one analytical characteristic variable, it is preferably possible for a characteristic curve versus the time to be formed, which, through analytical considerations, yields the at least one analytical characteristic variable. The acceleration characteristic curve may alternatively also be specified in terms of the traversed rolling circumference or in terms of the traversed angle of the tire sensor module or of the measurement point during a rotation of the tire through a particular angle. It is however alternatively also conceivable for the at least one analytical characteristic variable to be derived directly from the detected acceleration for example in an electronic circuit implemented in hardware form, for example by virtue of values of the detected acceleration being compared, without resorting to a characteristic curve.

The observed time period or the traversed rolling circumference or the traversed angle are selected such that at least one deviation in the acceleration at the tire inner side, which arises owing to the contact of the vehicle tire with the roadway and the resulting deformation of the vehicle tire, is detected by the measurement point. Thus, the acceleration is detected within an observation window in which a radius of curvature of the tire inner side of a rotating vehicle tire deviates, as a result of the contact of the vehicle tire with the roadway, from a radius of curvature of a non-deformed vehicle tire. This deviation in the radius of curvature and thus in the acceleration occurs in particular from the run-in of the vehicle tire into a tire contact patch to the run-out of the vehicle tire out of the tire contact patch, wherein the radius of curvature also changes in a transition region shortly before the run-in and shortly after the run-out, in which the vehicle tire does not make contact with the roadway. Here, the tire contact patch is to be understood to mean a ground contact area, such that a region is selected which is slightly larger than the ground contact area. The entire region composed of tire contact patch or ground contact area and transition region will hereinafter be referred to as tire contact patch region.

From the detected acceleration in the observation window, at least one analytical characteristic variable which characterizes the profile of the detected acceleration is derived through analytical considerations. Here, an analytical characteristic variable is to be understood within the context of the invention to mean, for example, a change in the profile of the detected acceleration within the tire contact patch region and, here, preferably a maximum positive change or a maximum negative change, that is, in the characteristic curve, respectively a maximum positive gradient or a maximum negative gradient—that is, the mathematically minimum gradient. Furthermore, an analytical characteristic variable may be understood to mean a time interval or an angular interval or a distance difference along the rolling circumference, that is, an angle or distance covered by the measurement point on the rolling circumference, that is, in the characteristic curve, an x-axis spacing between two observation points.

Thus, the non-periodic behavior of the detected acceleration within a tire contact patch region yields the analytical characteristic variable, which characterizes the profile of the detected acceleration or the profile of the characteristic curve, that is, periodic characteristics such as for example natural vibrations, harmonic vibrations or disturbance vibrations remain disregarded in the calculation of the profile depth according to an aspect of the invention.

The mathematical mapping that assigns at least one tire characteristic influencing variable, that is, a profile depth and/or a wheel load, to the at least one derived analytical characteristic variable is preferably monotonous. Here, it is provided that, via the monotonous mapping, either exactly one analytical characteristic variable, that is, a measured, scalar variable, is uniquely assigned exactly one wheel load, that is, likewise a scalar variable, via a functional relationship, or else two analytical characteristic variables, that is, a vector of measured, scalar variables which are both dependent on the profile depth and on the wheel load, are uniquely assigned a profile depth and a wheel load, that is, likewise a vector with two scalar variables, via a mapping matrix and a shift vector.

It is preferable here for a linear or approximately linear mapping to be provided. That is, in the case of only one measured scalar variable, there is provided as a linear mapping for example a linear or approximately linear calibration curve, which may emerge for example from a linear approximation to or interpolation of previously determined discrete measurement values. Here, approximately linear is to be understood to mean that the observed calibration curve runs within a tolerance band around the linear approximation to the observed calibration curve. Here, the tolerance band corresponds to an upward and downward deviation of less than 15%, preferably 5%, from the linearly approximated calibration curve. Thus, in particular, a very widely open parabola or an exponential profile which rises with a shallow gradient are also encompassed, which can each be linearly approximated without an upward or downward deviation of more than 15%, preferably 5%, from the original profile over the observed range.

In the case of a vector with two measured scalar variables, the linear mapping is determined by the mapping matrix and the shift vector with in each case constant elements. This yields a characteristic map having multiple linearly running so-called iso-lines with opposite gradients, which intersect in each case at intersection points. Here, the iso-lines specify the possible components of the two tire characteristic influencing variables that may be present in the case of a fixed value of the respective analytical characteristic variable. The intersection points thus constitute the solutions to a linear first-order equation system, the constant coefficients of which correspond to the constant elements of the mapping matrix and of the shift vector. The intersection points thus reflect the possible assignments of the two derived analytical characteristic variables to the two tire characteristic influencing variables via the linear mapping, wherein the influence of the respective tire characteristic influencing variable on the analytical characteristic variables is specified via the two opposite gradients of the iso-lines.

Since a linear or at least approximately linear mapping is used, the tire characteristic influencing variable can be determined with the same accuracy in the entire range. A determination of the profile depth or of the wheel load with high accuracy is thus advantageously possible even in the case of almost worn-out vehicle tires, or over the entire range of the wheel load relevant for a vehicle, that is, in particular in the case of an unladen or fully laden vehicle, because a change in the analytical characteristic variable can, via the mathematical mapping, be assigned an adequately resolvable change in the profile depth or the wheel load. It is thus possible to output a profile-depth-dependent warning or a wheel load determination with very high accuracy and reliability.

The respective mapping, that is, the calibration curve or the mapping matrix and the shift vector, may preferably be determined in advance for each tire type and stored in a control unit, such that, after the determination of the analytical characteristic variable, a conversion to the wheel load or the profile depth can be performed preferably in the control unit. It is however also possible for the calibration curve or the mapping matrix and the shift vector to be determined for the first time during travel.

For the determination of the tire characteristic influencing variables via the at least one analytical characteristic variable, use may be made of various methods, wherein each method is based in each case on a preferably linear or approximately linear mapping, which yields the relationship between the at least one analytical characteristic variable and the at least one tire characteristic influencing variable.

In a first embodiment or method, provision is made for the profile of a detected radial acceleration to be observed, which can preferably be specified in a characteristic map which specifies the radial acceleration measured at the measurement point plotted versus the time or the traversed rolling circumference or the traversed angle of the measurement point.

In this profile of the radial acceleration, an observation point is placed at the point at which the radial acceleration of the measurement point at the run-in into the tire contact patch region is specified, and a further observation point is placed at the point at which the radial acceleration at the run-out from the tire contact patch is specified. Here, both observation points normally lie, in the case of a rotating tire, at a relative high point in the profile of the radial acceleration observed over one revolution of the tire. That is, in this method, one of the analytical characteristic variables is the x-axis spacing between two observation points on the characteristic curve that specifies the profile of the radial acceleration, that is, the time interval or the angular interval or the distance difference along the rolling circumference covered by the measurement point between the run-in and the run-out.

The observation window is thus selected such that the radial acceleration can be detected at least at the run-in into the tire contact patch and at the run-out from the tire contact patch.

Since not only the wheel load but also the profile depth has an influence on the x-axis spacing between the two selected observation points, it is the case in this method that the component of the profile depth and of the wheel load in the x-axis spacing is determined, that is, to determine the wheel load, the part caused by the presently existing profile depth is extracted from the x-axis spacing. This is preferably likewise performed on the basis of the profile of the radial acceleration, such that the influence of the profile depth can advantageously be accurately determined even during travel, that is, as the vehicle tire is wearing and the profile depth is changing.

For this purpose, in the profile of the detected radial acceleration or in the characteristic curve that characterizes the profile, a further analytical characteristic variable is determined which is likewise dependent both on the wheel load and on the profile depth. For this purpose, an observation point is placed preferably on the point of the characteristic curve with the maximum positive gradient and/or the maximum negative gradient within the tire contact patch region. The observation window is in that case thus additionally selected such that at least the maximum positive change and/or the maximum negative change of the radial acceleration within the tire contact patch region are detected. Whether the point with the maximum positive or the maximum negative change or gradient is selected as observation point may for example depend on the signal quality for a particular tire type. Provision may also be made for a mean value of the two gradients to be determined and used as the basis for the further observation.

For the determination of the maximum positive and the maximum negative gradient, it is advantageously possible for a derivative, for example a numerically or analytically determined derivative, of the characteristic curve with respect to the time or the traversed rolling circumference or the traversed angle to be formed. The ordinate value of the high point and of the low point of the derivative respectively yields the value of the maximum positive and the maximum negative gradient of the characteristic curve. Here, it is also possible for the derivative or the change of the radial acceleration to be analyzed, without a characteristic curve being formed, directly from the detected radial acceleration, for example via electronic circuits.

Thus, the maximum positive or the maximum negative gradient or change in the radial acceleration, which is dependent on the profile depth and at least slightly also dependent on the wheel load, are obtained as a further analytical characteristic variable. Alternatively, the observation point may also be selected such that not the point of maximum negative or maximum positive change in the radial acceleration or in the gradient of the characteristic curve is observed, but rather some other arbitrary point, which lies for example slightly offset with respect to the maximum negative or maximum positive change or gradient. There are then correspondingly different resulting influences of profile depth and wheel load.

From the two analytical characteristic variables, it is then possible to determine the component of the profile depth and of the wheel load in the x-axis spacing between the run-in and the run-out by virtue of the two derived analytical characteristic variables, that is, the maximum positive or the maximum negative change, or the x axis spacing, being uniquely assigned a wheel load and a profile depth via a linear mapping, preferably a two-dimensional mapping matrix and a shift vector with in each case constant elements. The mapping matrix and the shift vector may in this case be determined in advance for a tire type via tests, for example by virtue of the change in the respective analytical characteristic variable being analyzed in the case of a variation both of the wheel load and of the profile depth, wherein each iso-line within the characteristic map represents a fixed or constant value of the respective analytical characteristic variable.

It is thus advantageously possible for both the profile depth and the wheel load acting on the vehicle tire to be easily determined reliably and with high accuracy.

In a second embodiment or method, a peak width of a peak in the characteristic curve in which the radial acceleration of the measurement point is plotted versus the time or the traversed rolling circumference or the traversed angle of the measurement point is observed. A peak arises within the tire contact patch region as a result of the radial acceleration at the measurement points falling to ideally zero when the vehicle tire lies on the roadway and the measurement point thus runs approximately parallel to the roadway. Here, the peak width of the peak may be mapped via a preferably linear mapping onto a wheel load, wherein the relationship is yielded by a preferably linear or approximately linear calibration curve for this second method. Here, the linear calibration curve is applicable at least in the entire range of the wheel loads relevant for a vehicle, that is, in particular for wheel loads between an unladen and a fully laden vehicle.

The peak width can be determined by virtue of a point on a falling flank of the peak being selected as one observation point and a point on a rising flank of the peak being selected as a further observation point. The difference in the abscissa values (x values) of the two observation points, that is, the x-axis spacing, directly yields the peak width, wherein preferably the same ordinate value (y value) is selected for the two observation points. Thus, in this second embodiment, the analytical characteristic variable is the x-axis spacing between two observation points, which corresponds to a time interval or an angular interval or a distance difference along the rolling circumference between two acceleration states, wherein the radial acceleration in both acceleration states is approximately identical. Thus, in this method, the observation window is selected such that at least the peak, formed by the falling radial acceleration and the rising radial acceleration, within a tire contact patch region is detected.

The two observation points are advantageously selected such that the maximum positive gradient or the maximum positive change in the radial acceleration is present at one observation point, and the maximum negative gradient or the maximum negative change in the radial acceleration is present at the other observation point, wherein the ordinate value may differ slightly for the two observation points, in particular owing to the dynamics of the vehicle tire during travel. In this way, it is advantageously possible for an influence of the profile depth on the peak width at the observed ordinate value to be minimized, because the peak width at the maximum positive and the maximum negative gradient ideally does not change significantly with the profile depth. In this way, it is advantageously possible for processing effort to be saved, because the wheel load can be reliably determined with adequately high accuracy even without compensation of the profile depth.

The x-axis spacing can in this case advantageously be determined from the derivative of the characteristic curve in which the profile of the radial acceleration is plotted, by virtue of the x-axis spacing between the high point of the derivative and the low point of the derivative being determined. That is, the difference between the abscissa value of the high point of the derivative and the abscissa value of the low point of the derivative is calculated. The analytical characteristic variable can thus also be determined directly from the extreme points of the derivative, possibly also via electronic circuits implemented using hardware, in which the x-axis spacing, that is, the time interval or the angular interval or the distance difference along the rolling circumference, between the extreme points is determined, without the use of a characteristic curve.

To save processing effort, it is also possible for the peak width to be determined at a peak height of preferably 50%, that is, the radial acceleration at the two observation points corresponds approximately to 50% of the radial acceleration at the high point of the characteristic curve, wherein the high point is determined from a weighted averaged profile over several tire rotations, and/or from a profile smoothed in accordance with the floating mean value principle, of the detected radial acceleration, such that natural vibrations or noise signals have no significant influence in the establishment of the peak height. In this way, the formation of the derivative can advantageously be omitted, and the influence of the profile depth on the peak width can nevertheless be kept low, such that an approximate determination of the wheel load is reliably possible in this way too, without compensation of the profile depth being imperatively necessary. Alternatively, it is also possible for the peak width at a peak height of between 25% and 75% to be observed, wherein the profile depth however then has a greater influence. It is however possible, depending on accuracy demands, for the wheel load determined therefrom to be used without compensation of the profile depth, wherein then, the inaccuracy resulting from the influence of the profile depth is accepted. Even at a peak height below 25% and above 75%, the determination of the wheel load over the peak width remains possible, wherein then, the influence of the profile depth is so great that the influence of the profile depth on the peak width can advantageously be determined with a linear mapping matrix and a shift vector, analogously to the first embodiment, and thus the component of the profile depth can be calculated, or the influence of the profile depth on the wheel load can be compensated, in order to be able to determine the exact wheel load.

In a third embodiment or method, the tangential acceleration is observed. The characteristic curve thus specifies the tangential acceleration of the measurement point versus the time or versus the traversed rolling circumference or the traversed angle of the measurement point. Within a tire contact patch region, the tangential acceleration runs through at least one high point, a zero crossing and a low point, wherein the x-axis spacing between the high point and the low point, that is, the difference between the abscissa value of the high point and the abscissa value of the low point, can be assigned a wheel load via a preferably linear mapping, for example a linear or approximately linear calibration curve. Here, the high point and the low point are preferably determined from a profile weighted and averaged over multiple tire rotations, and/or from a profile smoothed in accordance with the floating mean value principle, of the detected tangential acceleration, such that natural vibrations or noise signals have no significant influence on the establishment of the high point and/or of the low point. Here, the linear calibration curve is applicable at least in the entire range of the wheel loads relevant for a vehicle, that is, in particular for wheel loads between an unladen and a fully laden vehicle.

That is, in this embodiment, an observation point is placed at the high point and a further observation point is placed at the low point of the characteristic curve, and the x-axis spacing, or the time interval or the angular interval or the distance difference along the rolling circumference, is determined as analytical characteristic variable. The observation window is selected such that at least the maximum and minimum tangential acceleration within a tire contact patch region are detected. Here, the x-axis spacing is likewise not influenced significantly by the profile depth, such that a compensation is not necessary, and the processing effort can thereby advantageously be kept low in order to be able to reliably determine the wheel load with high accuracy.

Alternatively, it is also possible for a time interval or the angular interval or the distance difference along the rolling circumference between the maximum and minimum tangential acceleration within the tire contact patch region to be determined directly, for example via electrical circuits, without a characteristic curve being formed from the detected tangential acceleration.

It is advantageously also possible for all three methods to be implemented in parallel, for example in order to be able to perform a plausibility check on the wheel load determined via one method, or in order to be able to form a weighted mean value from wheel loads calculated using different methods.

In all three embodiments, the profile of the detected acceleration or the characteristic curve can advantageously be determined in weighted fashion. That is, profiles or characteristic curves are recorded, and averaged in weighted fashion, over multiple, for example between 10 and 10,000, tire rotations. Then, from the averaged profile or the averaged characteristic curve, the analytical characteristic variables are determined in accordance with the method. It is thereby advantageously possible for noise signals or irregularities during a tire rotation that falsify the signal to be compensated; the signal quality and thus the accuracy in the determination of the profile depth and/or of the wheel load via the respective mapping increases. In addition or alternatively, smoothing for example of a floating mean value may be applied in order to be able, analogously to a low-pass filter, to cut off relatively high frequency components. In this way, it is advantageously possible for the signal quality to be further improved, such that a determination of the profile depth and/or of the wheel load is made more accurate.

The evaluation of the analytical characteristic variables and thus the determination of the wheel load and/or of the profile depth in accordance with the respective embodiment is preferably performed outside the tire sensor module. For this purpose, the tire sensor module transmits only the determined analytical characteristic variables, which are determined in the tire sensor module on the basis of the measured acceleration values, that is, in particular from the tangential acceleration and/or from the radial acceleration, to the control unit, in which the conversions are then performed via the respective mathematical mappings in accordance with the three embodiments, for example via corresponding software. The determination of high and low points, spacings or gradients or changes is performed here via simple processing operations, implemented using software or hardware, on the tire sensor module.

To save resources, the acceleration is advantageously detected, and processed in the tire sensor module, only over the time period or the observation window that is relevant to the respective method. In this way, the calculation can be performed more efficiently in the tire sensor module, because the acceleration outside the observation window has no influence on the calculations.

It is advantageously furthermore possible for a tire temperature and/or a tire pressure and/or a wheel speed to be taken into consideration, which may be transmitted to or determined in the control unit. These factors have at least a small influence on the accelerations used in the individual embodiments and thus on the profile of the characteristic curves, and may likewise be determined on the basis of the signals transmitted by the tire sensor module. The control unit can suitably compensate the influence of the factors in order to permit a more exact determination of the wheel load and/or of the profile depth.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
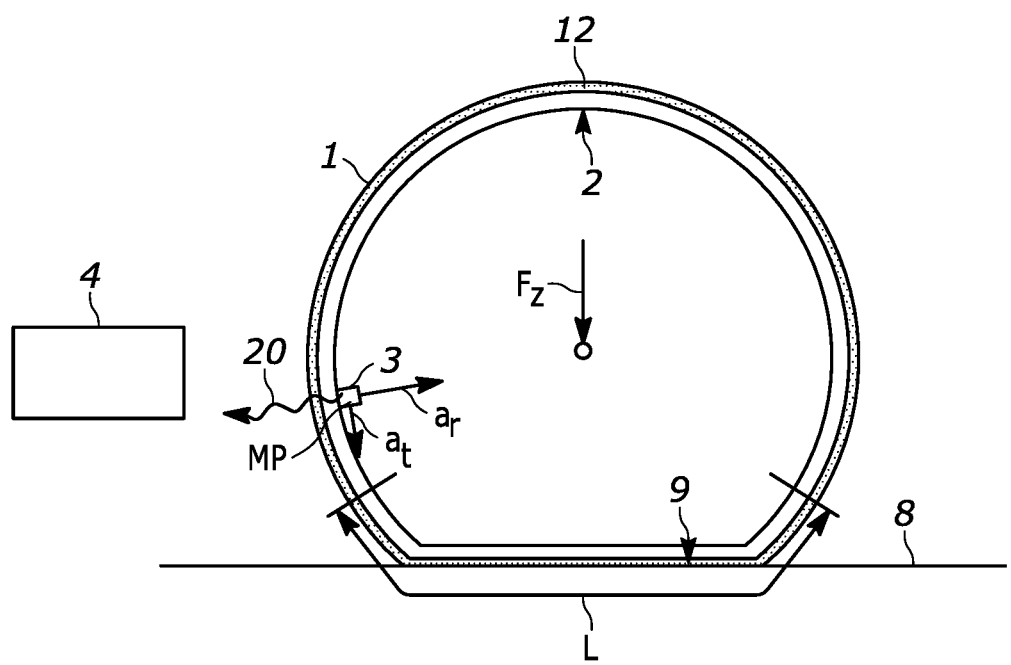
FIG. 1 shows a motor vehicle tire having a tire sensor module.

FIG. 1 illustrates a vehicle tire 1, on the tire inner side 2 of which there is arranged a tire sensor module 3. The tire sensor module 3 is arranged such that, via the tire sensor module 3, it is possible in particular to determine an acceleration, influenced by a deformation of the vehicle tire 1, of a measurement point MP. The acceleration may be in particular a radial acceleration $a_r$ or a tangential acceleration $a_t$ of the measurement point MP. The tire sensor module 3 can in particular transmit analytical characteristic variables, which may be derived from the measured acceleration $a_r$, $a_t$, for example via a radio signal 20 to a control unit 4, which can correspondingly further process the radio signals 20.

Figure 2:
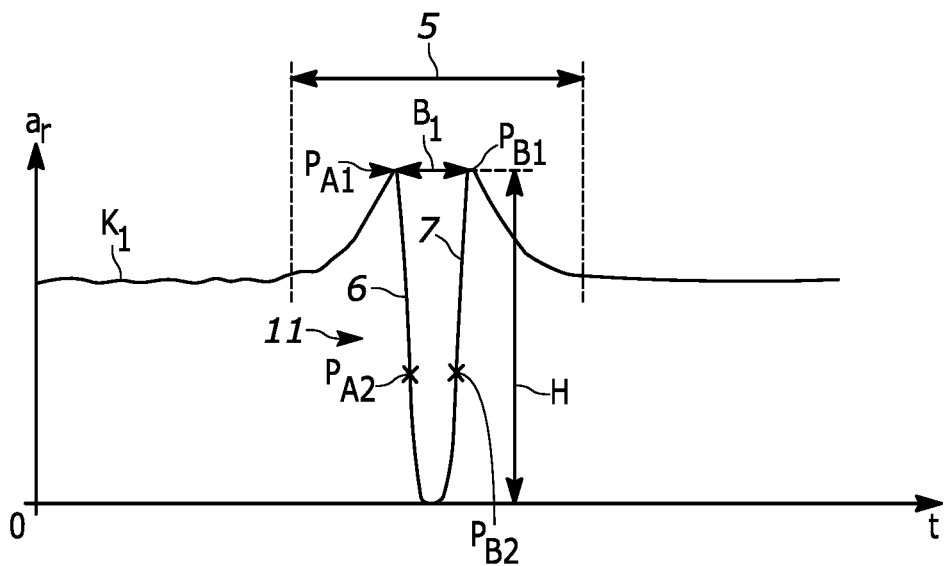
FIG. 2 shows a characteristic curve for a radial acceleration.

In a first and a second embodiment, the radial acceleration $a_r$ is observed. In this regard, by way of example, FIG. 2 illustrates a characteristic curve $K_1$ in which the radial acceleration $a_r$ measured by the tire sensor module 3 is plotted versus the time t. Outside an observation window 5, the radial acceleration $a_r$ is approximately constant. Within the observation window 5, the radial acceleration $a_r$ initially rises to a high point, then has a falling flank 6 which hereafter falls approximately to zero and subsequently transitions into a rising flank 7, which rises up to a second high point. At greater time values t, the radial acceleration $a_r$ falls again to a constant value outside the observation window 5, wherein the exact profile is dependent on the orientation of the tire sensor module 3 within the vehicle tire 1. Thus, in this example, the observation window 5 corresponds to a tire contact patch region L, in which a curvature of the tire inner side 2 changes owing to the deformation of the vehicle tire 1, such that the radial acceleration $a_r$ observed at the tire inner side 2, also changes.

The radial acceleration $a_r$ becomes minimal, that is, ideally zero, when the measurement point MP is situated in the region of a ground contact area 9 of the vehicle tire 1, within which the vehicle tire 1 is in contact with a roadway 8. The vehicle tire 1 deforms in the region of the ground contact area 9 such that the tire inner side 2 runs ideally parallel to the roadway 8 in a region which is situated opposite a tread 12, lying on the roadway 8, of the vehicle tire 1; the radial acceleration $a_r$ thus ideally becomes zero at these points.

In the first embodiment, for the determination of at least one tire characteristic influencing variable which, in this embodiment, is given by a profile depth D of the vehicle 1 and a wheel load $F_z$, firstly an x-axis spacing $B_1$ between two observation points $P_{A1}$, $P_{B1}$ on the characteristic curve $K_1$ is determined as an analytical characteristic variable. Here, the two relative high points of the characteristic curve $K_1$ are selected as observation points $P_A$, $P_B$, wherein the relative high point before the falling flank 6 corresponds to the radial acceleration $a_r$ at the run-in into the tire contact patch, and the relative high point after the rising flank 7 corresponds to the radial acceleration $a_r$ at the run-out from the tire contact patch of a rotating vehicle tire 1.

The x-axis spacing $B_1$ is dependent both on the wheel load $F_z$ acting on the vehicle tire 1 and on the profile depth D of the vehicle tire 1. To be able to determine the respective influence of the two parameters $F_z$, D, firstly a further analytical characteristic variable $S_1$, $S_2$ is determined, which is likewise dependent on the wheel load $F_z$ and the profile depth D.

Figure 2A:
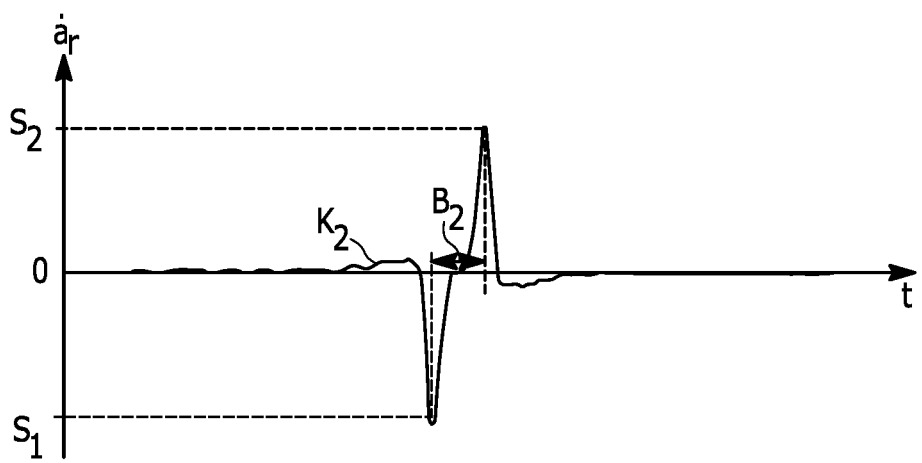
FIG. 2A shows a derivative of the characteristic curve as per FIG. 2 for the derivation of a wheel load in accordance with a first and a second embodiment.

For this purpose, a maximum negative gradient $S_1$ or a maximum positive gradient $S_2$ of the characteristic curve $K_1$ within the observation window 5 is determined as analytical characteristic variable, wherein the maximum negative gradient $S_1$ is assigned to the falling flank 6 and the maximum positive gradient $S_2$ is assigned to the rising flank 7. It is then preferably possible to form a derivative $K_2$ of the characteristic curve $K_1$ with respect to the time t, which derivative is illustrated in FIG. 2A. An ordinate value (y value) of a low point and of a high point of the derivative $K_2$ then yields the maximum negative gradient $S_1$ and the maximum positive gradient $S_2$ respectively.

For the further evaluation, for this purpose, that point of the characteristic curve $K_1$ which is assigned the lowest ordinate value in the derivative $K_2$ is selected as a first observation point $P_{A2}$, or that point of the characteristic curve $K_1$ which is assigned the highest ordinate value in the derivative $K_2$ is selected as a second observation point $P_{B2}$. The gradients $S_1$ and $S_2$ of the first observation point $P_{A2}$ and of the second observation point $P_{B2}$ respectively are subsequently transmitted as analytical characteristic variables by the tire sensor module 3 to the control unit 4 via the radio signal 20, along with the determined x-axis spacing $B_1$. Whether the maximum negative gradient $S_1$ or the maximum positive gradient $S_2$ is used may depend on the signal quality for a respective tire type. However, the two gradients $S_1$, $S_2$ may each be considered for the following calculations, possibly also as a weighted mean value.

Then, in the control unit 4, via a mapping matrix M with constant elements a, b, c, d and with a shift vector V with tire-specific constants $C_a$ and $C_b$, the two analytical characteristic variables $S_1$ or $S_2$ and $B_1$ are uniquely assigned both a profile depth D and a wheel load $F_z$. Here, the assignment may for example take the following form:

$$\begin{bmatrix} S_1 \\ B_1 \end{bmatrix} = \begin{bmatrix} a & b \\ c & d \end{bmatrix} \cdot \begin{bmatrix} D \\ F_z \end{bmatrix} + \begin{bmatrix} C_a \\ C_b \end{bmatrix} \text{ with}$$

$$M = \begin{bmatrix} a & b \\ c & d \end{bmatrix} \text{ and}$$

$$V = \begin{bmatrix} C_a \\ C_b \end{bmatrix} \text{ or}$$

$$\begin{bmatrix} D \\ F_z \end{bmatrix} = \left\{ \begin{bmatrix} S_1 \\ B_1 \end{bmatrix} - \begin{bmatrix} C_a \\ C_b \end{bmatrix} \right\} \cdot \begin{bmatrix} a & b \\ c & d \end{bmatrix}^{-1}$$

This assignment applies analogously to the gradient $S_2$. Here, the elements a, b, c, d of the mapping matrix M and $C_a$ and $C_b$ of the shift vector V are constant, such that a linear mapping is provided. To determine the profile depth D and the wheel load $F_z$, it is thus merely necessary to determine the constants a, b, c, d, $C_a$, $C_b$ and the inverses of the mapping matrix M, which may be derived from measurements performed in advance. For this purpose, it is for example possible to determine the change in the respective analytical characteristic variable $S_1$, $S_2$, $B_1$ as a function of a variation of the wheel load $F_z$ and of the profile depth D, wherein the constants a, b, c, d each specify the magnitude of the change. The gradients $S_1$, $S_2$ or the x-axis spacing $B_1$ are read from the characteristic curve $K_1$ or from the derivative $K_2$.

Figure 2B:
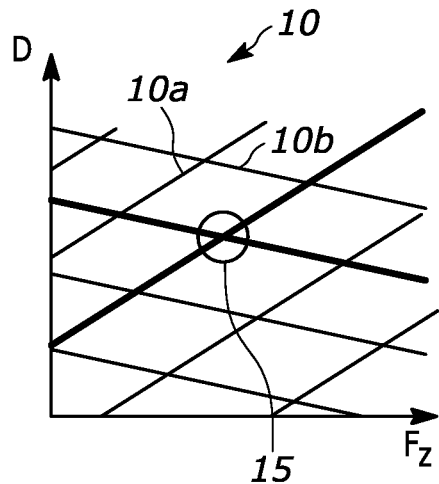
FIG. 2B shows a characteristic map for the determination of a wheel load and of a profile depth in accordance with the first embodiment.

This assignment thus specifies a linear first-order equation system which can be represented by a characteristic map 10 shown in FIG. 2B. The characteristic map 10 has parallel-running iso-lines 10a with a positive gradient and parallel-running iso-lines 10b with an opposite, negative gradient. Each iso-line 10a has a constant value $S_1$, $S_2$ in the event of variation of the wheel load $F_z$ and of the profile depth D, and each iso-line 10b has a constant x-axis spacing $B_1$ in the event of variation of the wheel load $F_z$ and of the profile depth D. The iso-lines 10a, 10b intersect at intersection points 15, wherein the intersection points 15 specify the solutions of the linear equation system, such that the intersection points 15 yield the wheel load $F_z$ and profile depth D determined for a particular analytical characteristic variable $S_1$ or $S_2$ and $B_1$.

Mapping matrices M or inverses of the mapping matrices and shift vectors V may be stored for different tire types in the control unit 4.

Figure 2C:
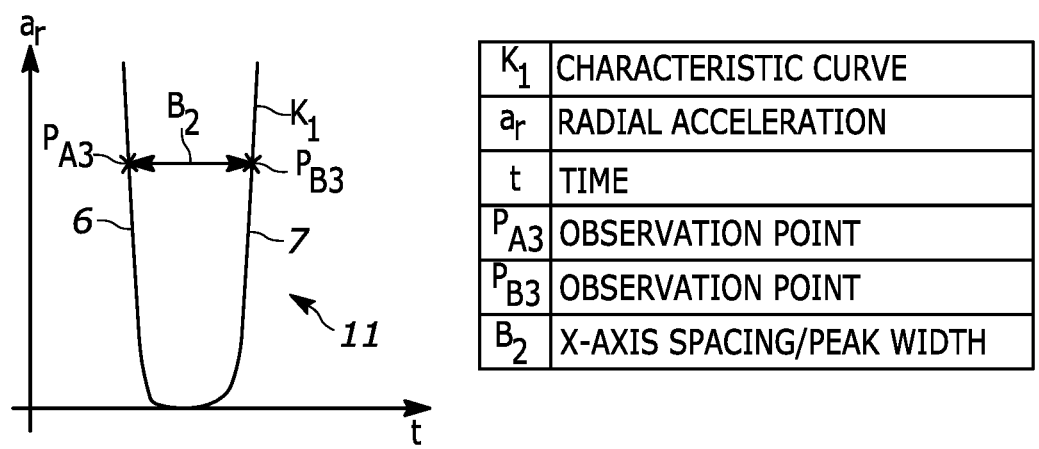
FIG. 2C show the wheel load $F_z$.

In a second embodiment, the peak 11 formed from the falling flank 6 and the rising flank 7 is observed, wherein, using a calibration curve 10c stored for this embodiment, a peak width $B_2$ of the peak 11 illustrated in FIG. 2C yields the wheel load $F_z$. In this embodiment, the peak width $B_2$ is determined at those points of the peak 11 at which the maximum negative gradient $S_1$ and the maximum positive gradient $S_2$ is present. At these points, the peak width $B_2$ is dependent virtually exclusively on the wheel load $F_z$, and the influence of the profile depth D on the peak width $B_2$ is insignificant and, depending on accuracy requirements, can be disregarded.

This means an x-axis spacing that specifies the peak width $B_2$ is formed between a first observation point $P_{A3}$ and a second observation point $P_{B3}$, wherein the ordinate values of the two observation points $P_{A3}$, $P_{B3}$ need not necessarily be equal. The peak width $B_2$ at the points with the maximum gradient $S_1$, $S_2$ in terms of magnitude may in this case also be derived from the derivative $K_2$, wherein, in the case of FIG. 2A, the peak width $B_2$ can be derived from the x-axis spacing between the high point and low point of the derivative $K_2$.

Alternatively, as an ordinate value of the two observation points $P_{A3}$, $P_{B3}$, it is also possible for a value to be selected which corresponds to approximately 50% of the peak height H or to between 25% and 75% of the peak height H; that is, the radial acceleration ar has at these points fallen to approximately 50% or to between 25% and 75% of the radial acceleration $a_r$ at the high point of the characteristic curve $K_1$, wherein the high point is determined from a profile weighted and averaged over several tire rotations, and/or from a profile smoothed in accordance with the floating mean value principle, of the detected radial acceleration $a_r$. It is also possible to select, as an ordinate value, a value which corresponds to less than 25% or more than 75% of the peak height H. Then, however, the influence of the profile depth D must be taken into consideration again, wherein this may be performed through corresponding selection of a mapping matrix and of a shift vector, which take the influences of the two tire characteristic influencing variables into consideration in the mapping. At 50%, it is however possible here, depending on accuracy requirements, for an influence of the profile depth D to be disregarded.

Figure 4:
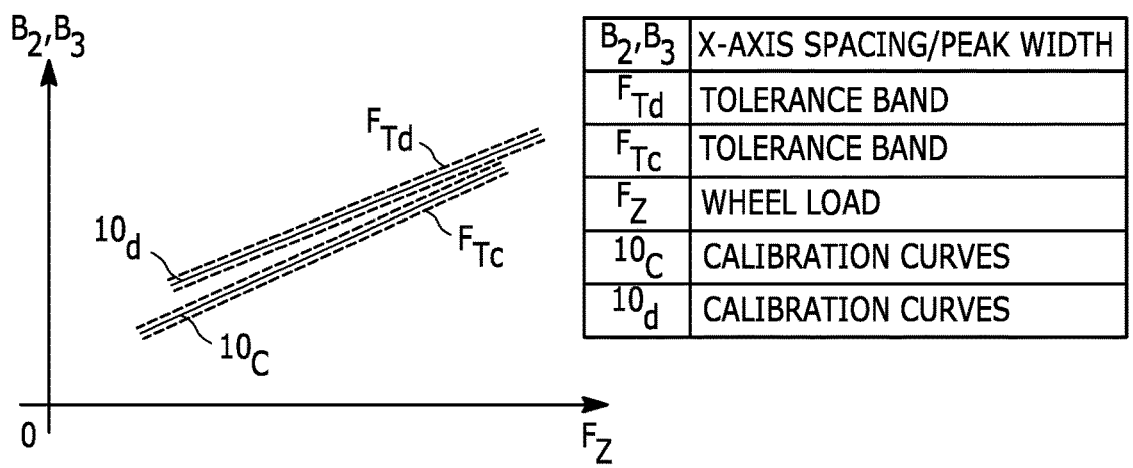

The respective peak width $B_2$ yields the wheel load $F_z$ in accordance with $F_z=F_c \times B_2+C_c$, wherein the factor $F_c$ specifies the gradient of the calibration curve 10c situated within a tolerance band $F_{Tc}$, and $C_c$ represents a tire-specific constant. That is, the calibration curve $10_c$ uniquely assigns a wheel load $F_z$ to the peak width $B_2$, as illustrated in FIG. 4. The above linear assignment yields the wheel load $F_z$ at least for the wheel loads $F_z$ that are relevant in a vehicle, that is, in particular for wheel loads $F_z$ between an unladen and a fully laden vehicle. If the peak width $B_2$ is not determined at the points of the maximum gradient $S_1$, $S_2$ in terms of magnitude, the peak width $B_2$ and the x-axis spacing $B_1$ are assigned a wheel load $F_z$ and a profile depth D via a corresponding mapping matrix, wherein the mapping matrix and the calculation may be performed analogously to the first embodiment.

Figure 3:
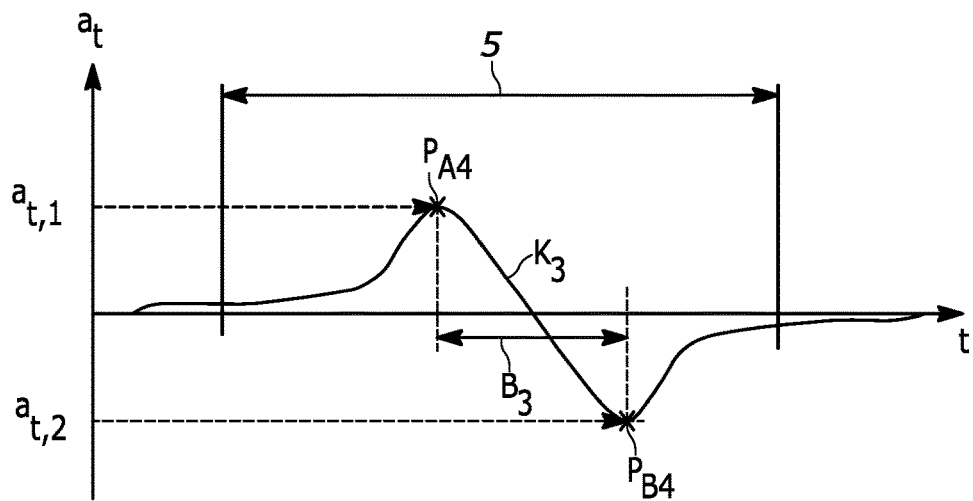
FIG. 3 shows a characteristic curve for a tangential acceleration for the determination of a wheel load in accordance with a third embodiment; and, FIG. 4 shows calibration curves for the determination of the wheel load in accordance with the second and third embodiments.

In a third embodiment, which is illustrated in FIG. 3, the tangential acceleration at versus the time t is observed and plotted as a characteristic curve $K_3$. Within the observation window 5, the tangential acceleration firstly runs through a high point, has a zero crossing and transitions into a low point, wherein the exact profile is dependent on the orientation of the tire sensor module 3 relative to the direction of rotation of the vehicle tire 1. For the determination of the wheel load $F_z$, firstly the point with the highest tangential acceleration $a_{t,1}$, that is, the high point of the characteristic curve $K_3$, is selected as a first observation point $P_{A4}$, and the point with the lowest tangential acceleration $a_{t,2}$, that is, the low point of the characteristic curve $K_3$, is selected as a second observation point $P_{B4}$, wherein the maximum and the minimum tangential acceleration ($a_{t,1}$, $a_{t,2}$) are determined from a profile weighted and averaged over multiple tire rotations, and/or from a profile smoothed in accordance with the floating mean value principle, of the detected tangential acceleration ($a_t$). The x-axis spacing $B_3$ between the first observation point $P_{A4}$ and the second observation point $P_{B4}$ can be uniquely assigned a wheel load $F_z$ via the calibration curve 10d, such that the following applies: $F_z=F_d \times B_3+C_d$, wherein $F_d$ is the gradient of a calibration curve 10d, which is provided for this third embodiment and which lies within the tolerance window $F_{Td}$, for the tangential acceleration $a_t$, and $C_d$ is a tire-specific constant. The above linear assignment yields the wheel load $F_z$ at least for the wheel loads $F_z$ that are relevant in a vehicle, that is, in particular for wheel loads $F_z$ between an unladen and a fully laden vehicle.

To improve the signal quality, provision may additionally be made for the characteristic curves $K_1$, $K_3$ to be averaged in weighted fashion over multiple rotations of the vehicle tire 1. In this case, the same observation window 5 is averaged in weighted fashion over for example ten rotations, and the wheel load $F_z$ is determined from the averaged characteristic curve $K_1$, $K_3$ in accordance with the corresponding embodiment. In this way, it is possible in particular for noise and irregularities in the signal profile to be suppressed. Furthermore, it is also possible for a floating mean value to be applied for the purposes of smoothing the characteristic curves $K_1$, $K_3$.

To improve the accuracy, it is additionally possible for further influences on the characteristic curves $K_1$, $K_3$ to be compensated. For example, a tire pressure p or a tire temperature $T_R$ or a wheel speed $v_R$ have influences on the radial acceleration $a_r$ and on the tangential acceleration $a_t$. With the knowledge of the respective influencing variables, the influences can be compensated by the control unit 4 via characteristic curves which are stored in the control unit 4 and which describe the influence of the tire pressure p or of the tire temperature $T_R$ or of the wheel speed $v_R$ respectively.

It is understood that the foregoing description is that of the preferred embodiments of the invention and that various changes and modifications may be made thereto without departing from the spirit and scope of the invention as defined in the appended claims.

LIST OF REFERENCE SIGNS

1 Vehicle tire
2 Tire inner side
3 Tire sensor module
4 Control unit
5 Observation window
6 Falling flank
7 Rising flank
8 Roadway
9 Ground contact area
10 Characteristic map
10a, 10b Iso-lines
10c, 10d Calibration curves
11 Peak
12 Tread
15 Intersection point
20 Radio signal
a, b, c, d Elements of the mapping matrix M
$a_r$ Radial acceleration
$a_t$ Tangential acceleration
$a_{t,1}$ Minimum tangential acceleration
$a_{t,2}$ Maximum tangential acceleration
$B_1$, $B_2$, $B_3$ x-axis spacing/peak width
$C_a$, $C_b$, $C_c$, $C_d$ Tire-specific constants
D Profile depth
$F_c$, $F_d$ Gradient of 10c, 10d
$F_{Tc}$, $F_{Td}$ Tolerance band in 10c, 10d
$F_z$ Wheel load
H Peak height
$K_1$, $K_3$ Characteristic curve
$K_2$ Derivative of $K_1$
L Tire contact patch region
M Mapping matrix
MP Measurement point
p Tire pressure
$P_{Ai}$, $P_{Bi}$ Observation point; i=1 ... 4
$S_1/S_2$ Change or gradient of the radial acceleration at the falling/rising flank 6/7
t Time
$T_R$ Tire temperature
V Shift vector
$v_R$ Wheel speed

What is claimed is:

1. A method for determining a tire characteristic influencing variable, the method:
  a) detecting an acceleration of a measurement point on a tire inner side of a vehicle tire by a sensor positioned on the tire inner side, wherein a deviation, caused by contact of the vehicle tire with a roadway, of the acceleration of the measurement point within an observation window is detected, where the acceleration comprises a radial acceleration and a tangential acceleration;
  b) deriving at least one analytical characteristic variable by the sensor which is characteristic of the detected acceleration, wherein the at least one analytical characteristic variable characterizes a non-periodic profile of the detected acceleration within one tire rotation, the at least one analytical characteristic variable comprising a rising gradient of the radial acceleration at a rising flank and a falling gradient of the radial acceleration at a falling flank;

receiving the at least one analytical characteristic variable at a control unit by a radio signal from the sensor; and, c) determining at least one tire characteristic influencing variable by the control unit in a manner dependent on the at least one analytical characteristic variable, wherein a mathematical mapping yields the dependency between the analytical characteristic variable and the tire characteristic influencing variable, wherein the mathematical mapping assigns at least one tire characteristic influencing variable to the at least one derived analytical characteristic variable and wherein the at least one tire characteristic influencing variable is stored in the control unit, the at least one tire characteristic influencing variable comprising a profile depth and a wheel load of the vehicle tire, the profile depth is a tread depth of the tire;

wherein a determination of the profile depth and the wheel load as at least one tire characteristic influencing variable includes using a mapping matrix (M) and a shift factor (V) having constant elements (a, b, c, d, $C_a$, $C_b$) which map analytical characteristic variables (S1, S2, B1) linearly onto the profile depth and the wheel load, wherein the analytical characteristic variables are dependent on the profile depth and the wheel load; and wherein the mapping matrix and the shift factor define a linear first-order equation system, the solution of which, for the two derived analytical characteristic variables yields, a wheel load and the profile depth.

2. The method of claim 1, wherein, for said determination of the at least one tire characteristic influencing variable as a mathematical mapping wherein the mathematical mapping maps the at least one analytical characteristic variable onto the at least one tire characteristic influencing variable, such that every value of the at least one analytical characteristic variable is assigned exactly one value of the at least one tire characteristic influencing variable.

3. The method of claim 2, wherein a determination of a wheel load as at least one tire characteristic influencing variable includes using a calibration curve which runs within a linear tolerance band, wherein the tolerance band runs with a deviation of less than 15% around a linear approximation to the calibration curve.

4. The method of claim 2, wherein a determination of a wheel load as at least one tire characteristic influencing variable includes using a calibration curve which runs within a linear tolerance band, wherein the tolerance band runs with a deviation of less than 5% around a linear approximation to the calibration curve.

5. The method of claim 2, wherein a determination of a wheel load as at least one tire characteristic influencing variable includes using a calibration curve which runs linearly, and the wheel load is determined from a multiplication of the at least one analytical characteristic variable by a gradient of the calibration curve taking into consideration a tire-specific constant.

6. The method of claim 1, wherein each analytical characteristic variable is assigned in each case one calibration curve.

7. The method of claim 1, wherein, as at least one analytical characteristic variable, a time interval or an angular interval or a distance difference along the rolling circumference between two acceleration states of the measurement point is derived from the detected acceleration.

8. The method of claim 7, wherein a maximum positive change of a radial acceleration within a tire contact patch region and a maximum negative change of the radial acceleration within a tire contact patch region are selected as acceleration states.

9. The method of claim 7, wherein a radial acceleration in both acceleration states is approximately identical, and the radial acceleration in both acceleration states corresponds to a value which lies between 25% and 75% of the maximum radial acceleration 5 within the tire contact patch region, and wherein the maximum radial acceleration is determined from at least one of a profile of the detected radial acceleration weighted and averaged over multiple tire rotations and a profile of the detected radial acceleration smoothed in accordance with the floating mean value principle.

10. The method of claim 8, wherein the derivation of the at least one analytical characteristic variable from the radial acceleration includes:

forming a characteristic curve versus a time or a traversed rolling circumference or a traversed angle of the measurement point on the vehicle tire from the detected radial acceleration;

selecting two observation points on the characteristic curve; and, deriving a peak width of a peak in the characteristic curve from an abscissa spacing of the two observation points.

11. The method of claim 10, wherein the derivation of the peak width includes forming a derivative of the characteristic curve formed by the radial acceleration versus the time or the traversed rolling circumference or the traversed angle of the measurement point on the vehicle tire.

12. The method of claim 7, wherein a maximum tangential acceleration within a tire contact patch region and a minimum tangential acceleration within the tire contact patch region are selected as acceleration states, wherein the maximum and the minimum tangential acceleration are determined from at least one of a profile of the detected tangential acceleration weighted and averaged over several tire rotations and a profile of the detected tangential acceleration smoothed in accordance with the floating mean value principle.

13. The method of claim 12, wherein the derivation of the at least one analytical characteristic variable from the tangential acceleration includes:

forming a characteristic curve versus the time or the traversed rolling circumference or the traversed angle of the measurement point on the vehicle tire from the detected tangential acceleration;

selecting two observation points on the characteristic curve; and, deriving an x-axis spacing within the characteristic curve from an abscissa spacing of the two observation points.

14. The method of claim 7, wherein local high points within a tire contact patch region are selected as acceleration states.

15. The method of claim 14, wherein a further analytical characteristic variable is derived from a change in a radial acceleration versus a time or the traversed rolling circumference or a traversed angle of the measurement point on the vehicle tire.

16. The method of claim 15, wherein, as a further analytical characteristic variable, a maximum negative change within a tire contact patch region, or a maximum positive change within the tire contact patch region, of the radial acceleration versus the time or the traversed rolling circumference or the traversed angle of the measurement point on the vehicle tire is derived.

17. The method of claim 16, wherein the derivation of the further analytical characteristic variable from the change of the radial acceleration includes:
- forming a characteristic curve from the detected radial acceleration;
- selecting at least one observation point on the characteristic curve; and,
- deriving the change of the radial acceleration from the at least one observation point.

18. The method of claim 15, wherein the determination of a profile depth and a wheel load from the two analytical characteristic variables includes forming a characteristic map, which defines a mapping matrix, wherein the characteristic map has intersecting iso-lines, and intersection points of the iso-lines yield the wheel load and the profile depth for the derived analytical characteristic variables.

19. The method of claim 1 further comprising at least one of averaging the profile of the detected acceleration in weighted fashion over multiple tire rotations and smoothing the profile of the detected acceleration in accordance with the floating mean value principle.

20. The method of claim 1, wherein the determination of the at least one tire characteristic influencing variable includes additionally compensating at least one of an influence of a tire pressure, a tire temperature, and a wheel speed on the detected acceleration of the measurement point.

* * * * *